United States Patent [19]
Shiota et al.

[11] 3,943,881
[45] Mar. 16, 1976

[54] NUMERIC CHARACTER INDICATOR

[75] Inventors: Takizo Shiota; Takao Mogi, both of Tokyo, Japan

[73] Assignee: Sony Corporation, Tokyo, Japan

[22] Filed: June 3, 1974

[21] Appl. No.: 476,154

[30] Foreign Application Priority Data
June 2, 1973   Japan.......................... 48-65259[U]

[52] U.S. Cl.......... 116/124.1 R; 40/130 E; 313/513
[51] Int. Cl.²......................................... H03J 1/04
[58] Field of Search 116/124.1 R, DIG. 29, DIG. 31, 116/DIG. 35, 114 R, 124 R; 350/160 LC; 313/513, 517, 519, 518, 499, 500, 510; 340/336, 324 M; 40/28 C, 52 R, 130 E, 130 K

[56] References Cited
UNITED STATES PATENTS

| | | |
|---|---|---|
| 3,174,144 | 3/1965 | O'Neil.................................... 313/517 |
| 3,343,155 | 9/1967 | Pahlavan.............................. 340/336 |
| 3,737,707 | 6/1973 | Yanagisawa........................ 313/519 |
| 3,781,863 | 12/1973 | Fujita............................. 350/160 LC |
| 3,789,388 | 1/1974 | Medwin........................ 350/160 LC |

FOREIGN PATENTS OR APPLICATIONS
797,515   4/1936   France .............. 40/130 E

*Primary Examiner*—S. Clement Swisher
*Assistant Examiner*—Denis E. Corr
*Attorney, Agent, or Firm*—Lewis H. Eslinger; Alvin Sinderbrand

[57] ABSTRACT

A TV channel indicator is disclosed where the channel numbers 1 to 9 are indicated substantially in the center part of the indicator, which also coincides with that of the channel numbers 10 to 99.

5 Claims, 14 Drawing Figures

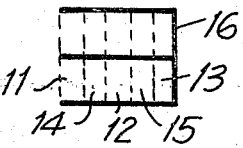
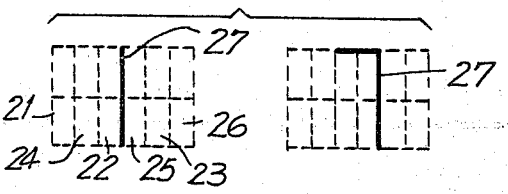
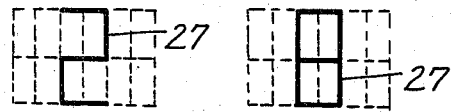
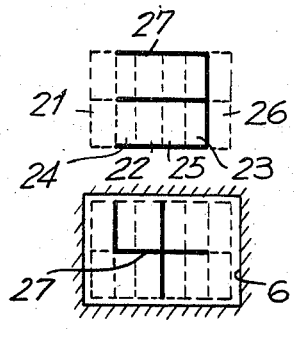
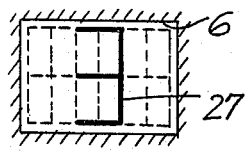
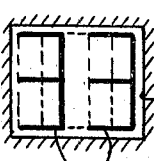
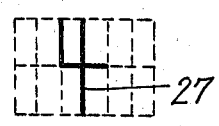
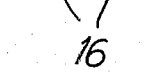
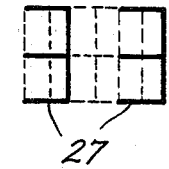
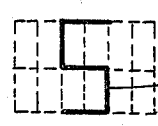
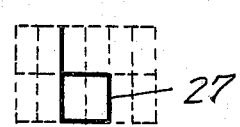
FIG.6     FIG.5     FIG.4

NUMERIC CHARACTER INDICATOR

BACKGROUND OF THE INVENTION

This invention relates to a numerical character indicator, for example, for use in TV channel indicators which indicate numerical characters by using a combination of segments such as light emission diodes which is electrically energized to emit light or liquid crystals which absorb or reflect light.

So far, where segments of these kinds are used for TV channel indicators, the segments are arranged in groups which are arrayed for each digit, respectively, in order that one segment group indicates numerals of the first order and another segment group indicates numerals of the second order. But with such an indication system, when a channel number covers two digits, it is required to array two sets of segment groups such as the groups A and B on the right and left sides as shown in FIG. 14. In such a case, when the numeral to be indicated is of a single digit ranging 1 to 9, either one of the left or right segment groups A or B will be used, and when numerals formed of two digits ranging 10 to 99 are to be indicated, both the left and right groups A and B are used so that the left group A indicates a numeral of second order and the right group B indicates a numeral of first order.

With the numerical characters indicated in such a way as mentioned above, the numerals of one digit ranging 1 to 9 are indicated in either the right-hand or left-hand portion of the channel indicator window, resulting in less than desirable perception to observers. Further, if either the left or right segment groups A or B should malfunction, thereby indicating only one digit of a numeral which normally should have two digits, it is very difficult to discern the presence of such a malfunction.

SUMMARY OF THE INVENTION

This invention solves the afore-mentioned shortcomings inherent to the prior art, and in which single digit numerals ranging 1 to 9 are individually indicated near the central part of an indicator window by providing primary groups of indicating segments which have secondary groups of segments interposed therebetween, at least one secondary group cooperating with adjacent primary groups to indicate the single-digit numerical characters and at least the primary groups being used to indicate the first digit and the second digit, in order that the numerals ranging 1 to 9 or numerals ranging 10 to 99 are indicated on all the segments and in the central position of the indicator window.

Accordingly, one object of this invention is to provide an improved TV channel indicator.

Another object of this invention is to provide a numeric character indicator comprising a plurality of segment groups to indicate numerical characters of two digit, i.e., 10 to 99 and a secondary segment group which cooperates to indicate numerical characters of one digit, i.e., 1 to 9.

Another object of this invention is to provide an improved channel indicator where the central part of the indicator always coincides with that of the numeric characters regardless of the characters to be indicated therein.

Other objects, features and advantages of this invention will become apparent from the following description taken in conjunction with the accompanying drawings.

BRIEF DESCRIPTION OF THE DRAWINGS

FIGS. 1-7 show embodiments according to this invention;

DESCRIPTION OF THE PREFERRED EMBODIMENTS

Figure 2:
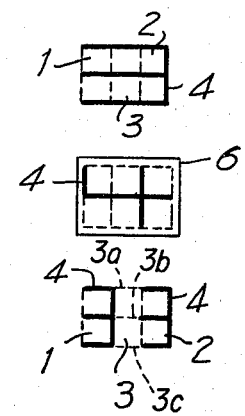
Figure 1:
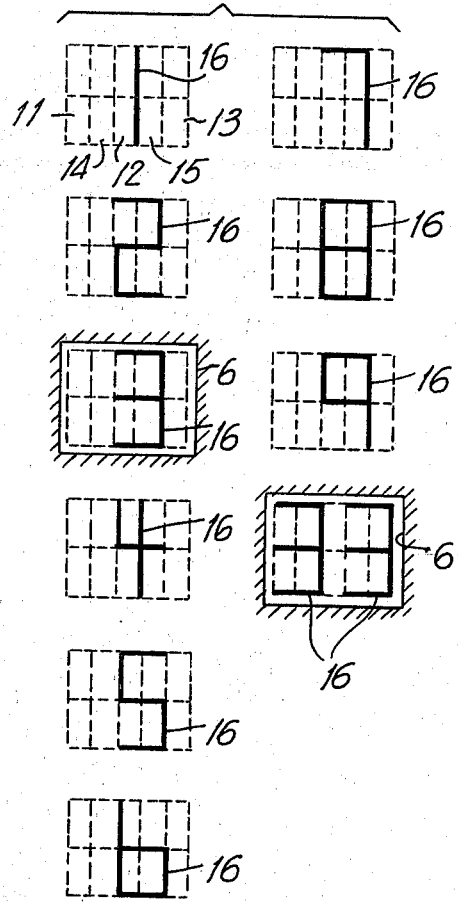
Figure 8:
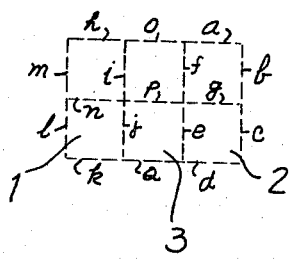
FIGS. 8-13 show electric connection diagrams to illustrate the signal transmission paths according to the embodiment of FIG. 1.

FIGS. 1 and 2 show a secondary segment group 3 composed of segments 3a, 3b and 3c interposed between a primary segment group 1 composed of segments 1a, 1b, 1c, 1d, 1e, 1f and 1g arranged in figure 8-shape and a primary segment group 2 composed of segments 2a, 2b, 2c, 2d, 2e, 2f and 2g also arranged in figure 8-shape. In this case, a one-digit numeral identified by the reference numeral 4 ranging 1 to 9 is indicated by the cooperation between the secondary segment group 3 primary segment groups 1 and 2, particularly the segments 1b, 1c and 2e, 2f which are parts of the primary segment groups 1 and 2.

Where the numerals to be indicated span over two digits, i.e., second order numerals, the indication is made by using only the primary segment groups 1 and 2 of FIGS. 1 and 2. When a one digit numeral is to be indicated, the numeral can be indicated using both of the primary segment groups 1 and 2 and the secondary segment group 3, as shown in FIG. 2. In the case of FIG. 2, an indication of two digit numerals may be carried out in the same manner as in FIG. 1 above.

Figure 3:
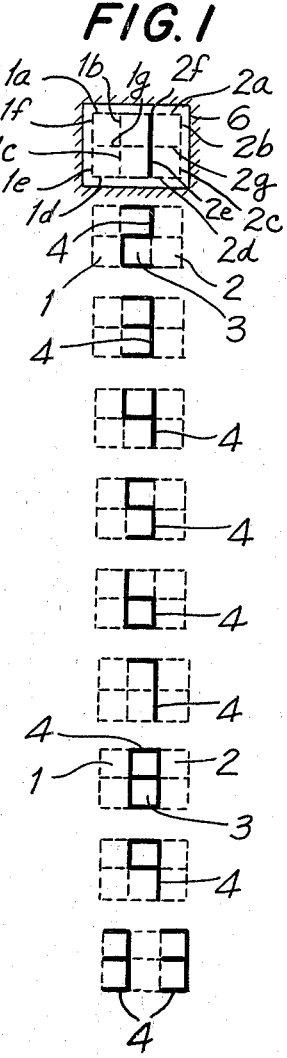

FIGS. 3 and 4 show the case in which three primary segment groups 11, 12 and 13 are arranged with secondary segment groups 14 and 15 interposed therebetween. FIGS. 5 and 6 show the case in which the secondary segment groups 24, 25 and 26 alternate with the primary segment groups 21, 22 and 23.

Figure 7:
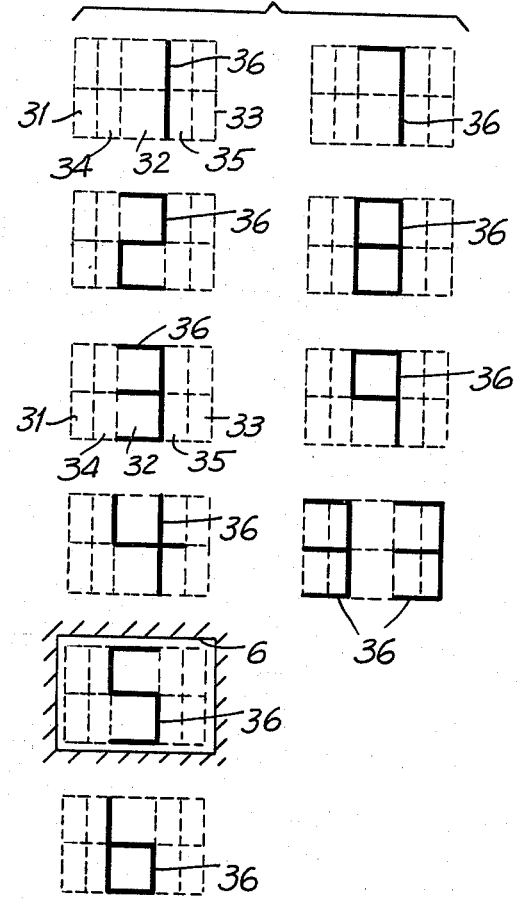

The arrangement shown in FIG. 7 is similar to the embodiments of FIGS. 3 and 4 in that the secondary segment groups 34 and 35 are interposed between the primary segment groups 31, 32 and 33, but features a wide primary segment group 32 at the center in order to indicate the single-digit or two-digit numerals as shown. 6 in Figure represents a window frame for housing the character indicator.

Figure 9:
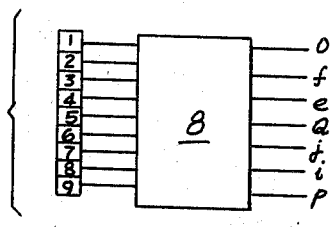
Figure 10:
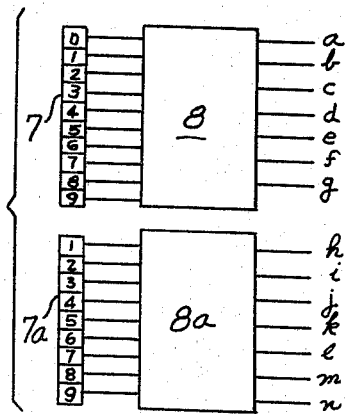
Figure 14:
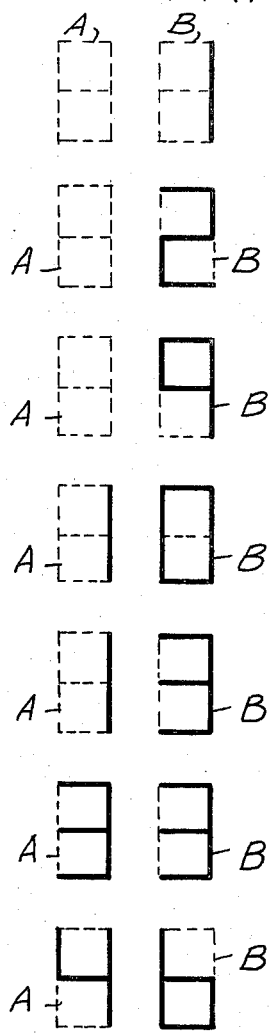
FIG. 14 shows a schematic diagram of segments used in prior art.

With reference to the arrangement shown in FIG. 1 mentioned indicated, for example, the method to obtain indications of particular numerals by applying an electric current to selective segments, is illustrated in FIGS. 8 and 9 for of the case of one digit (1 to and the 9) and in FIGS. 8 and 10 for the case of two digits (10 to 99). This method consists of feeding electrical outputs to the segments identified by reference letters in FIG. 8 through segment decoder 8 or decoders 8 and 8a by way of, for example switches 7 or switches 7 and 7a which may be of known type as in adders and typewriters.

Figure 11:
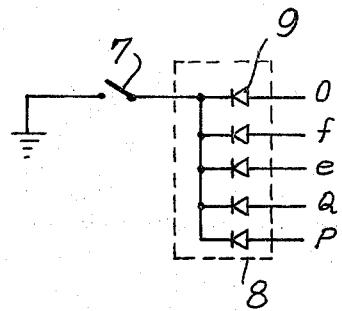

If now it is intended to indicate a one digit numeral such as 3, the switch 7 corresponding to the character 3 may be activated as shown in FIG. 11, to energize only the segments o, f, e, q and p. If it is intended to indicate the numeral 8, the switch 7 corresponding to the character 8 may be activated in order that electric signals are applied to individual segments o, f, e, q, j, i and *p*, as shown in FIG. 12.

Figure 13:
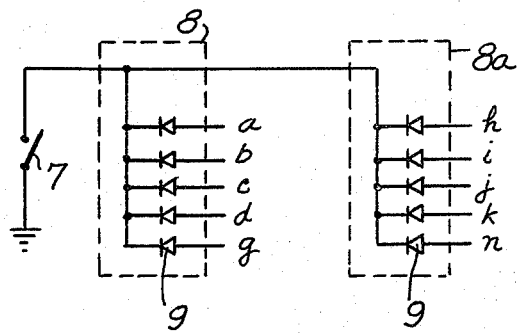

FIG. 13 shows the instance wherein a two digit numeral is, in this case the indication 33. A decoder 8 for the digit of one order and a decoder 8a for the digit the second order are provided between the switch 7 and particular segments which are energized for this character indication.

Figure 12:
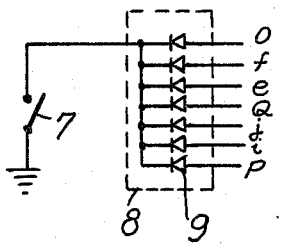

9 in FIGS. 11 to 13 represents diodes to insulate the circuit of each numeral from the circuit of other numeral.

By interposing a secondary segment group between primary segment groups as in this device, it is possible to eliminate the uncomfortable perception of characters which are displaced from the center of the channel indicator window, i.e., enabling the display of numerals correctly at the center of the indication window whether they may be one digit numerals or two-digit numerals, and in addition, allowing easy discovery of malfunctions of a segment group, and requiring less total number of segments.

What is claimed is:

1. A numeric character indicator unit formed of an array of selectively energizable light transmitting segments, said segments being arranged in a plurality of primary segment groups having at least one secondary segment group interposed therebetween, means for selectively energizing the segments in said secondary group and segments in at least one adjacent primary group to display single-digit numerals 1 to 9, and means for selectively energizing the segments in no less than two primary groups of segments to display two-digit numerals 10 to 99, said two digits being spaced apart by at least one of a primary and secondary group.

2. The numeric character indicator unit of claim 1 consisting of two primary segment groups, each being capable of indicating all single-digit numerals, and a secondary segment group interposed therebetween.

3. The numeric character indicator unit of claim 1 consisting of three primary segment groups arranged alternately with two secondary segment groups wherein single-digit numerals are indicated by at least one secondary segment group in cooperation with both adjacent primary segment groups and each digit of a two-digit numeral is indicated by an end primary segment group in cooperation with a secondary segment group.

4. The numeric character indicator unit of claim 1 consisting of three primary segment groups arranged alternately with three secondary segment groups wherein single-digit numerals are indicated by at least one secondary segment group in cooperation with both adjacent primary segment groups and two-digit numerals are indicated by the combination of an end primary segment group in cooperation with an adjacent secondary segment group and an end secondary group in cooperation with an adjacent primary segment group.

5. The numeric character indicator unit of claim 1 wherein each primary segment group is comprised of a seven-segment array in figure 8 configuration and each adjacent secondary segment group is comprised of a three-segment horizontal array.

* * * * *